United States Patent Office 3,229,658
Patented Jan. 18, 1966

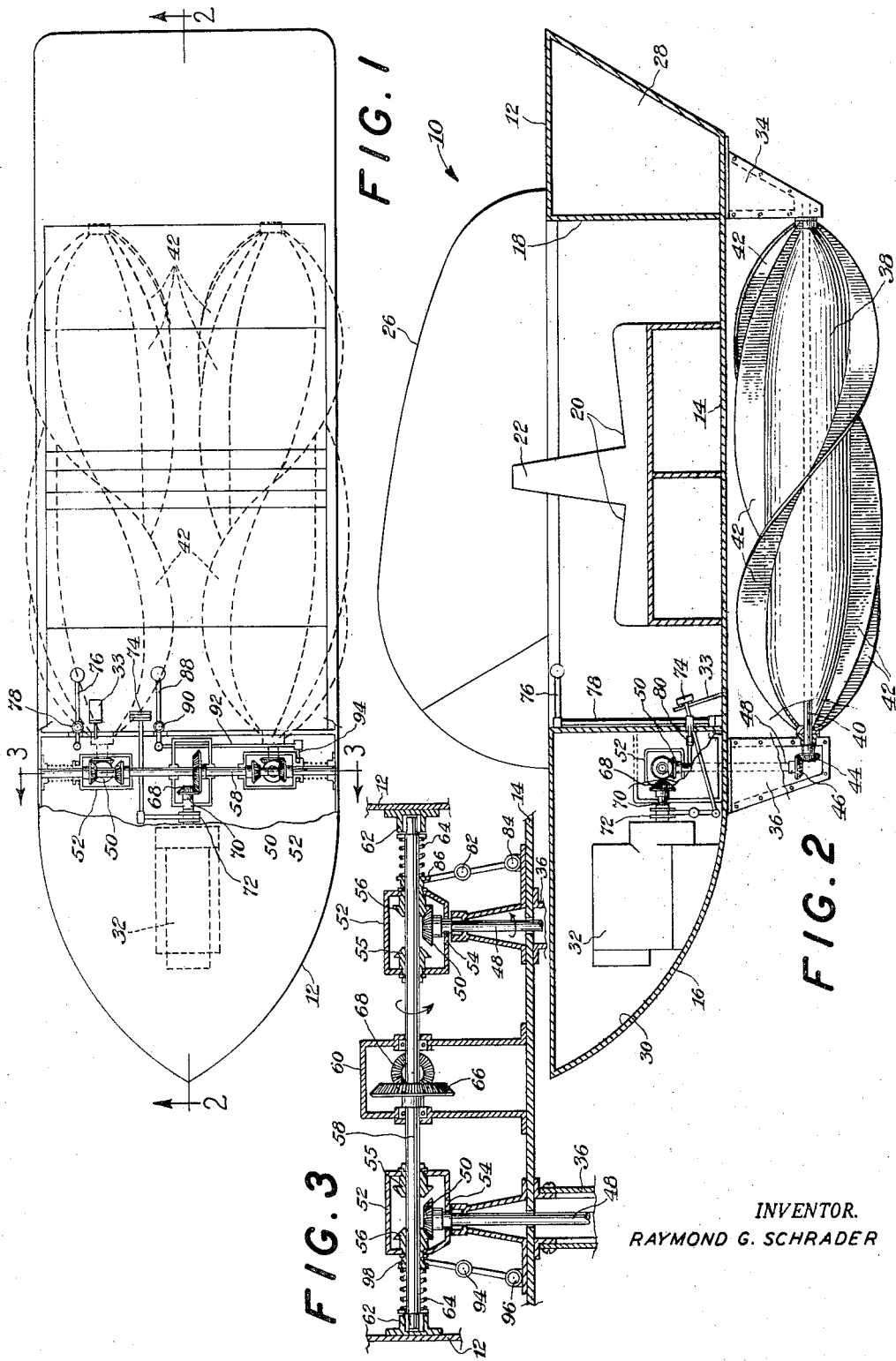

3,229,658
AMPHIBIOUS MUD AND WATER VEHICLE
Raymond G. Schrader, Rte. 1, Mentor, Kans.
Filed Feb. 19, 1965, Ser. No. 433,955
2 Claims. (Cl. 115—1)

This invention relates to multi-purpose vehicles and, more particularly, to a vehicle which can be readily propelled in both mud and water.

It is an object of the present invention to provide a multi-purpose vehicle which can be driven at relatively high speeds through mud and water, to facilitate its use in the shallow water and in marshes and the like.

Still another object of the present invention is to provide a mud and water vehicle of the type described which can be readily maneuvered in congested areas, propelled forwardly and rearwardly with facility, and which can be made to turn about in a very small radius.

Still an additional object of the present invention is to provide a mud and water vehicle of the aforementioned type which is propelled by a pair of auger type rotors, each of which may be independently controlled in the passenger compartment, so as to reverse direction of rotation of either one or both for turning sharply or reversing direction in minimum time.

A further object of the present invention is to provide a mud and water vehicle of this type which is extremely simple in construction, provides maximum flexibility in use, and which can be manufactured at a relatively low cost.

All of the foregoing and still further objects and advantages of this invention will become apparent from a study of the following specification, taken in connection with the accompanying drawing, wherein:

FIGURE 1 is a top plan view, with parts broken away, of a mud and water vehicle made in accordance with the present invention;

FIGURE 2 is a longitudinal cross sectional view taken along line 2—2 of FIGURE 1; and FIGURE 3 is an enlarged fragmentary cross sectional view taken along line 3—3 of FIGURE 1 showing details of the power transmission system.

Referring now more in detail to the drawing, an amphibious mud and water vehicle 10 made in accordance with the present invention is shown to include a hull 12 having a substantially flat bottom 14 and upwardly sloping front wall 16 to define a central passage or compartment 18. A pair of back to back seats 20 with a common back rest 22 are mounted within the passenger compartment 18 to accommodate four persons. A fixed windshield 24 and a removable bubble-type canopy 26 completely enclose the compartment 18 for maximum comfort and safety to passengers when in use.

The stern portion of the hull 12 encloses a fuel tank 28, whereas the forward portion of the hull 12 defines an engine compartment 30 within which a gasoline engine 32 is mounted. Although a V-8 type engine is preferred, it will be recognized that any suitable type and size engine may be used for this purpose.

Depending from the bottom 14 of the hull 12, are a pair of laterally spaced apart rear bearing supports 34 and a pair of laterally spaced apart front bearing or gear housings 36. Each set of these dependings housings 34, 36 rotatably supports the rear and forward ends, respectively, of a hollow cylindrical member 38, each of which has preferably four radially outwardly projecting spiral vanes 42, substantially in the form of an auger which serve as propelling members for moving the hull 12 through mud or water. All of the vanes of one of the members 38 spiral in the same direction and in a direction opposite to the direction of spiralling of the corresponding vanes of the other one of the members 38, whereby in propelling the vehicle in one direction or the other, the members 38 must be driven in opposite directions, thus equalizing lateral forces acting upon the hull 12 to provide motion in a straight line and minimizing side movement of the hull because of any lateral components which might otherwise be set up.

Each hollow member 38 is secured upon a longitudinal shaft 40 having a bevel gear 44 at its forward end received within the forward depending housing 36. Each such bevel gear 44 is in driven engagement with a similar bevel gear 46 carried upon individual depending output shafts 48 that are provided with bevel gears 50 at the opposite upper ends which are received within individual gear boxes 52.

The upper ends of the output shafts 48 are received through laterally extending slots 54 in the respective gear box 52, to accommodate lateral shifting movement of each gear box 52 relative to each respective output shaft 48.

A pair of facing bevel gears 55, 56 are rotatably carried within each gear box 52 in spaced apart relation upon a splined transversely extending power take-off shaft 58. The splined shaft 58 is rotatably supported at its center upon a gear housing 60, and at each end within bearings 62. Compression coil springs 64 encircling each end of the take-off shaft 58, act against the respective bearings 62 and the facing ends of the gear boxes 52 to yieldably urge one of the gears 56 into meshing engagement with the bevel gear 50 of each output shaft 48, for purposes hereinafter more fully described. A speed reduction gear 66 is secured centrally upon the splined take-off shafts 58 within the casing 60 and in meshing engagement with the drive bevel gear 68 of the output shaft 70 of the engine 32. A clutch mechanism 72 in the drive shaft of the engine 32, under the control of a foot pedal 74 in the passenger compartment 18, provides means for controlling the transmission of power from the engine to the take- off shaft 58. A foot pedal 33 in the passenger compartment 18, through suitable linkage, serves as a throttle for controlling the speed of rotation of the engine 32, to control the speed of the vehicle during use.

A pair of control gears are provided within the passenger compartment 18, adjacent the foot pedals 33, 74, for individually controlling the direction of rotation of each one of the drive cylinders 38. The control gear 76 for controlling the cylinder 38 on the right side of the vehicle, is at arm height and secured to the upper end of a vertical shaft 78 which is rotatably mounted within the passenger compartment. The lower end of the vertical shaft 78 includes a lever arm 80 that is pivotally engaged with a central portion of a shift lever 82 that is pivotally mounted at its lower end 84 upon the bottom wall 14 of the hull. The upper end of the shift lever 82 has a clevis 86 that interlockingly engages with the respective gear box 52, whereby the gear box 52 can be shifted against the action of the adjacent spring 64 to disengage the normally engaged gear 56 from engagement with the bevel gear 50 of the output shaft 48, thus interrupting the transmission of power to the light drive cylinder 38, independently of the transmission of power to the other drive cylinder. By extended shifting of the lever 76, the shift lever 82 can bring the other bevel gear 55 into engagement with the bevel gear 50 of the output shaft 48, to effect rotation of the right drive cylinder 38 in the opposite direction.

A control lever 88 is similarly provided for controlling the transmission of power and direction of rotation of the left drive cylinder 38. This control lever 88 is secured to a vertical shaft 90 which at its lower end has a connection with a control link 92 that is pivotally engaged with the shift lever 94 that is pivotally mounted at its lower end 96 upon the floor 14 of the hull. The upper end of this shift lever 94 is connected to a clevis 98 which may be actuated upon movement of the control lever 88 to shift the gear box 52 so as to disengage the normally engaged bevel gear 56 thereof from engagement with the bevel gear 50 of the left output shaft 48. Continued movement of the control lever 88 will thus bring the other bevel gear 55 into engagement with the bevel gear 50 of the output shaft 48 to effect reversal of rotation of the left drive cylinder 38, in a manner hereinbefore described.

It will thus be recognized that in actual use, the engine 32 may have an ignition and control system of any particular type. Through actuation of the clutch pedal 74 and throttle pedal 33, the power from the engine 32 can be transmitted to the take-off shaft 58 at any desired speed. Through individual or simultaneous actuation of the control levers 76, 88, power to either one or both of the drive cylinders 38 may be interrupted or reversed in the manner hereinbefore described. As illustrated in the drawing, the spring 64 normally urge the bevel gears 56 of each gear box 52 into driving engagement with the upper bevel gears 50 of each output shaft 48, which causes rotation of the drive cylinders 38 in opposite directions. However, since the direction of the spiral vanes 42 is opposite on each of the drive cylinders 38, the drive cylinders 38 will both propel the vehicle in a forward direction. Upon shifting both control levers 76, 88 to the driver's left side, the direction of rotation of both of the drive cylinders 38 will be reversed, to effect rearward movement of the vehicle. By shifting only one of the levers 76, 88 to the driver's left and leaving the other lever undisturbed, the vehicle can be made to turn sharply in one direction or the other, as will be readily understood in view of the fact that this would cause one of the drive cylinders 38 to tend to move its respective side of the vehicle forwardly and the other drive cylinder would tend to move its respective side of the vehicle rearwardly, whereby the vehicle would turn sharply about its central vertical axis. By shifting one lever 76, 88 to a central position, disengaging its respective gears 55, 56 from the output shaft 48 associated therewith, the vehicle would turn more gradually under the continuing rotation of the other drive cylinder. Thus, it will be recognized that through manipulation of the respective control levers 76, 88, the direction of movement of the vehicle and the changes in direction of movement of the vehicle would be accurately controlled. The linkage is arranged so that by moving either or both of the levers 76, 88 to the left, the vehicle will turn toward the left. With the parts in the positions shown in the drawing, both drive cylinders 38 will rotate so as to propel the vehicle in a forward direction.

It will also be recognized that by varying the size and capacity of the parts and hull, the size and power of the vehicle can be readily increased or decreased to suit any particular requirements. By having both drive cylinders 38 rotating in opposite directions, with the upper portions thereof turning outwardly relative to the sides of the hull, such will prevent any logs or limbs from becoming jammed between the vanes 42 and the bottom of the vehicle. In reversing the direction of rotation of the drive cylinders, care should therefore be exercised to avoid contact with any such logs or limbs which might become jammed between the opposite rotating augers at the center line of the hull. It will also be recognized that the relative sizes of the cylinders 38 and vanes 42 may be varied, but with a twelve inch diameter cylinder 38, a four inch wide vane 42 would be especially effective for a hull three and one-half feet wide and approximately twelve feet long.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. An amphibious mud and water vehicle comprising, in combination, a main hull having a central passenger compartment, a pair of elongated propelling members rotatably mounted beneath said hull in spaced apart parallel relationship parallel to the longitudinal axis of said hull, motive power means mounted within said hull, power transmission means drivingly connecting said motive power means to said propelling members, and gear means associated with said power transmission means and said motive power means for controlling the direction of rotation of said propelling members, each of said propelling members comprising a hollow cylindrical member having a plurality of radially outwardly projecting spiral vanes, said vanes of one of said members spirally in a direction opposite to the direction of spirally of said vanes of the other one of said members, said power transmission means comprising a power take-off shaft extending transversely of said hull, said motive power means having a drive shaft drivingly connected to said power take-off shaft, said gear means comprising a pair of gear boxes, each one of said gear boxes rotatably supporting a pair of spaced facing bevel gears, said bevel gears of each of said gear boxes being longitudinally slidably supported upon one end of said power take-off shaft for limited rectilinear movement thereupon, a pair of laterally spaced apart output shafts each rotatably carried by said hull adjacent said hollow cylindrical members and drivingly connected at one end thereto, the opposite end of each said output shaft being slidably received through a respective one of said gear boxes accommodating relative lateral movement thereof upon said power take-off shaft, a drive bevel gear carried by each of said output shafts between said respective facing bevel gears for selective engagement by one of said facing bevel gears, and spring means normally urging one of said facing bevel gears of each of said gear boxes into driving engagement with said respective drive bevel gear, and a pair of manually operated shift levers within said passenger compartment each having linkage connected to one of said gear boxes for selectively shifting said respective gear boxes upon said power take-off shaft to effect engagement of said drive bevel gear associated therewith with the other one of said facing bevel gears to reverse the direction of rotation of said respective cylindrical propelling member.

2. An amphibious mud and water vehicle as set forth in claim 1, wherein said spring means comprises a compression coil spring encircling each end of said power take-off shaft each acting between one end of said power take-off shaft and one of said gear boxes.

References Cited by the Examiner

UNITED STATES PATENTS

| | | | |
|---|---|---|---|
| 1,133,193 | 3/1915 | Stirn | 115—19 |
| 1,997,578 | 4/1935 | Eslick | 115—19 |
| 2,706,958 | 4/1955 | Cutting et al. | 115—19 |

MILTON BUCHLER, *Primary Examiner.*

ANDREW H. FARRELL, *Examiner.*